United States Patent [19]

Subrahmanyam

[11] Patent Number: 6,064,820
[45] Date of Patent: May 16, 2000

[54] APPARATUS AND METHOD TO INCREMENTALLY UPDATE SINGLE STATIC ASSIGNMENT (SSA) FORM

[75] Inventor: Pratap Subrahmanyam, Sunnyvale, Calif.

[73] Assignee: Hewlett-Packard Company, Palo Alto, Calif.

[21] Appl. No.: 09/085,299

[22] Filed: May 27, 1998

[51] Int. Cl.$^7$ ............................................. G06F 9/45
[52] U.S. Cl. ........................ 395/709; 395/707; 395/708
[58] Field of Search .................................. 395/705–709; 712/216, 217, 241

[56] References Cited

U.S. PATENT DOCUMENTS

| | | | |
|---|---|---|---|
| 5,293,631 | 3/1994 | Rau et al. | 395/709 |
| 5,327,561 | 7/1994 | Choi et al. | 395/705 |
| 5,396,627 | 3/1995 | Iitsuka | 395/709 |
| 5,448,737 | 9/1995 | Burke et al. | 395/706 |
| 5,475,842 | 12/1995 | Gilbert et al. | 395/706 |
| 5,584,027 | 12/1996 | Smith | 395/707 |
| 5,623,401 | 4/1997 | Baxter | 364/147 |
| 5,659,754 | 8/1997 | Grove et al. | 395/709 |
| 5,710,927 | 1/1998 | Robison | 395/709 |
| 5,768,596 | 6/1998 | Chow et al. | 395/709 |

OTHER PUBLICATIONS

Nianshu et al.,"Precise dependence tree for scalars within nested loops" IEEE, 1997, pp. 356–361.

Ramalingam et al., "An incremental algorithm for maintaining the dominator tree of a reducible flowgraph", POPL '94, ACM 1994, pp. 287–296.

Lavery et al., "Unrolling based optimizations for modulo scheduling"Proc. of MICRO–28, 1995, pp. 327–337.

Liu et al., "Loop induction variable canonicalization in parallelizing compilers", Proc. of PACT '96, IEEE 1996, pp. 228–237.

Johnson et al., "Dependence –based program analysis", ACM SIGPLAN, 1993, pp. 78–89.

Knobe et al., "Array SSA form and its use in parallelization", POPL '98, ACM, 1998, pp. 107–120.

McConnell et al., "Using Static single assignmenet form in a code optimizer", ACM 1992, pp. 152–160.

Cytron et al., "Efficient accomadation of May–alias information in SSA form", ACM SIGPLAN PLDI '93, ACM 1993, pp. 36–45.

Jong–Deok Choi, et al., "Incremental Computation Of Static Single Assingment Form", International Business Machines Corporation, Software Solutions Division, Document Number TR ADTI–1995–019 (also available as STL TR 03.638), Nov., 1995 (Original version: Nov., 1992), pp. 1–17.

Ron Cytron, et al., "Efficiently Computing Static Single Assignment Form And The Control Dependence Graph", ACM Transactions On Programming Languages And Systems, vol. 13, No. 4, Oct., 1991, pp. 451–490.

Tibor Gyimothy (Ed.), "Compiler Construction", 6th International Conference, CC'96, Linkoping, Sweden, Apr. 24–26, 1996 Proceedings, pp. 252–267. "Effective Representation Of Aliases And Indirect Memory Operations In SSA Form".

*Primary Examiner*—Tariq R. Hafiz
*Assistant Examiner*—Kakali Chaki

[57] ABSTRACT

A method and apparatus for incrementally updating SSA form after loop unrolling. The incremental SSA tool generates a non-ambiguous new name, in SSA form, for each original name defined in a loop and used outside of the loop after loop unrolling, by using the existing CFG structure for the software code that is created by the compiler. The incremental SSA tool renames the uses in the tails of the loop of a name defined within the loop into new clone names. The incremental SSA tool uses the new clone names created in the tails of the loop to rename other uses outside of the loop, of names that are defined within the loop, into new clone names. Also, the incremental SSA tool reconciles loop unrolled names that are used outside of the loop with the new clone names by creating new incarnation names.

18 Claims, 14 Drawing Sheets

```
PSEUDO CODE:              BASIC BLOCK:
N=2                       (1)
X=5                       (1)

REPEAT                    (2)
{
    IF N>1                (2)
    THEN
    {
        X=2               (3)
        T=X+3             (3)

IF T>4            (4)
        THEN GOTO L0      (4)

IF T>3            (5)
        THEN GOTO L3      (5)
    }
    ELSE                  (6)
        W=X+1             (6)

N=N-1                 (7)
}
UNTIL (N=0)               (8)

R=FUNCTION (X)            (9)
GOTO L2                   (9)

L0:L=X+12                 (10)
GOTO L1                   (10)

L3:A=6+X                  (11)

L2:W=X-3                  (12)

L1:Z=X+1                  (13)
```

APPARATUS AND METHOD TO INCREMENTALLY UPDATE SINGLE STATIC ASSIGNMENT (SSA) FORM

FIELD OF THE INVENTION

The present invention relates to software development tools and is directed more particularly to a compiler optimization tool that incrementally updates SSA form.

BACKGROUND OF THE INVENTION

A source program of software code may be manipulated by a computer compiler, and the compiler may include an optimizer that produces object code that executes faster and consumes less computer memory than object code produced by a compiler without an optimizer. Many compiler optimizers have been designed to execute instructions in a prescribed format that is predictable and therefore can be easily manipulated. One such format is single static assignment (SSA) form which requires that each variable in a transformed program is defined in only one definition statement.

A control flow graph (CFG) represents the flow of control of program code, where each node represents a basic block and each edge shows a possible path for the flow of control between basic blocks. A basic block has a single entry instruction and a single exit instruction that is defined by a branch instruction. If the first instruction in the basic block is executed, all other instructions in the basic block will be executed. A basic block may also consist of a single instruction. A CFG has a unique source node which is called an entry node.

A node with more than one successor is a branch node or a split node, and a node with more than one predecessor is a join node. For instance, a node will have multiple successors for conditional branches. A node $n_1$ dominates another node $n_2$ if every possible execution path from the entry to $n_2$ contains $n_1$. The flow of control of a loop may be described by the edges of the loop in which the edge has a head node and a tail node, and the head node dominates the tail node.

FIG. 1A illustrates a CFG 100 depicting the intermediate representation of a source program. A variable is defined when it is assigned a value, and it is used when it accessed without changing the value. Therefore, in FIG. 1A the variable x is defined in nodes 102 and 104, and is used in nodes 106 and 108. Further, since the variable x is defined more than once, the intermediate representation is not in SSA form.

When several names of a variable, $x_1, x_2, \ldots x_n$ reach a join node in a control flow graph, a phi ($\Phi$) function assignment statement $x_m = \Phi(x_1, x_2, \ldots x_n)$ may be inserted to merge the names into the definition of a new name, $x_m$ and therefore, $x_m$ is defined in only one definition statement, thus preserving the SSA form.

FIG. 1B shows the CFG 100 in SSA form. In order to transform the intermediate code depicted in FIG. 1A, in FIG. 1B the variable x has been renamed. The first name for the variable x is $x_1$ as shown in node 102. All uses are appropriately renamed to match the new name for the variable x so that the value flow from the variable's definition to its use(s) is explicitly apparent in the program text. For instance, $x_1$ is the name of the use of the variable x in node 106. The second name for the variable x is $x_2$ as shown in node 104. The third name for the variable x is $x_3$ as shown in node 108. The phi-function $\Phi(x_1, x_2)$ merges the $x_1$ and the $x_2$ names of the variable x into one definition statement for $x_3$, $x_3 = \Phi(x_1, x_2)$. The phi-function in node 108 can be reached from either node 102 or node 104 and also satisfies the requirements of SSA form. The original variable x now is represented by three names, $x_1$, $x_2$, and $x_3$.

Most optimization procedures require SSA form to ensure efficient optimization processing. Loop unrolling is such an optimization procedure and is produced by a method of replicating a loop during the process of compilation. However, loop unrolling can alter the code such that it is no longer in SSA form. That is, when a variable is renamed to satisfy SSA form requirements, the effects of loop unrolling must be considered and each new name for each unrolled loop iteration must be unique. Applying incremental update techniques such as SSA form along with loop unrolling are very difficult, as the effects of loop unrolling create many new names that are associated with the incarnations of the unrolled loop, and these new names must all be translated into SSA form. Most compiler technologies do not attempt loop unrolling updates and incremental SSA form updates in the same compiler cycle (hereinafter called a "compiler pass"). Rather, most compiler technologies compute the updated names in SSA form afresh after loop unrolling and do not attempt resource intensive incremental updates to translate the names into SSA form. There is therefore a need in the art to overcome this problem.

SUMMARY OF THE INVENTION

The present invention is a method and apparatus relating to compiler optimization technology that incrementally updates SSA form after loop unrolling. The present invention advantageously generates a non-ambiguous new name, in SSA form, for each original name defined in a loop and used outside of the loop after loop unrolling, by novelly using the existing CFG structure for the software code that is created by the compiler. The present invention renames the uses in the tails of the loop of a name defined within the loop into new clone names. The present invention uses the new clone names created in the tails of the loop to rename into new clone names, other uses outside of the loop of names that are defined within the loop. Also, the present invention reconciles loop unrolled names that are used outside of the loop with the new clone names by creating new incarnation names.

The present invention recognizes that when an original name of a variable that is defined in a loop is used outside of the loop and the loop has been unrolled, a considerable amount of compile time is required to resolve the original name with the new names associated with each incarnation of the unrolled loop. The name resolution between names of the variable used outside of the loop and the name of the variable defined within the loop occurs at the tail nodes of the loop, thereby creating a boundary between the names defined inside of the loop and the used names outside of the loop. This boundary simplifies the maintenance of the SSA form by resolving the names defined inside of the loop and the used names outside of the loop by an incremental update procedure which requires less compiler overhead than evaluating the names afresh as was done in the prior art.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DESCRIPTION OF THE EMBODIMENT

Figure 1A:
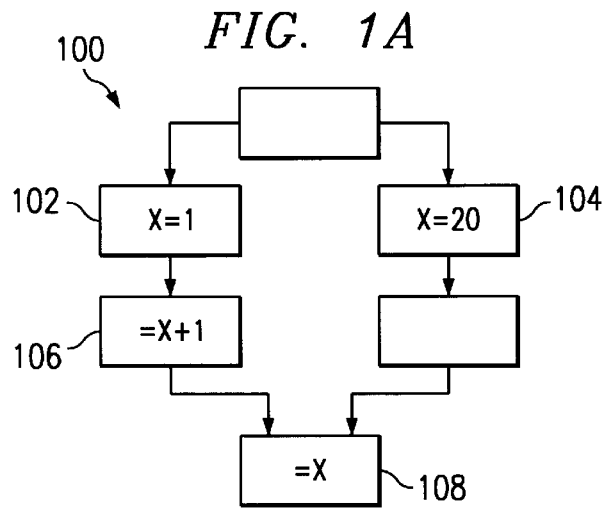
FIG. 1A illustrates a control flow graph representing an exemplary source program in non-SSA form.
Figure 1B:
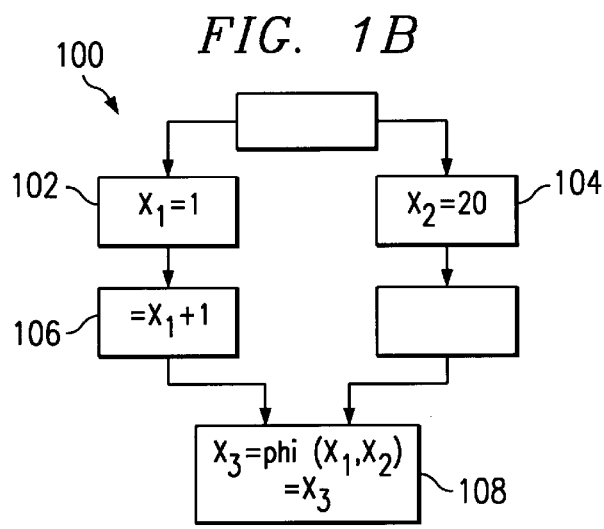
FIG. 1B illustrates a control flow graph representing the exemplary source program of FIG. 1A in SSA form.

As shown in the drawings for purposes of illustration the present invention is a compiler optimization tool that incrementally updates SSA form after loop unrolling. The present invention recognizes that when an original name of a variable that is defined in a loop is used outside of the loop and the loop has been unrolled, a considerable amount of compile time is required to resolve the new names, associated with each incarnation of the unrolled loop, with the original name. Each loop cycle of the unrolled loop will be referred to hereinafter as an "incarnation" of the loop.

Names defined inside the loop will herein be referred to as original names, new names used outside the loop before loop unrolling will herein be referred to as clone names, and new names used outside the loop after loop unrolling will herein be referred to as incarnation names. The present invention advantageously generates a non-ambiguous new name, in SSA form, for each original name defined in a loop and used outside of the loop, by novelly using the existing CFG structure for the software code that is created by the compiler. The name resolution between names of the variable used outside of the loop and the name of the variable defined within the loop occurs at the tail nodes of the loop, thereby creating a boundary between the names defined inside of the loop and the used names outside of the loop. This boundary simplifies the maintenance of the SSA form by resolving the names defined inside of the loop and the used names outside of the loop by an incremental update procedure which requires less compiler overhead than evaluating the names afresh as was done in the prior art.

SSA form and CFG construction and use are generally well known in the compiler and optimization arts. For a general discussion of existing compiler and optimization tool technology, see *Principles of Compiler Design*, by Alfred V. Aho and Jeffrey D. Ullman (Addison-Wesley, 1977), which is herein incorporated by reference in its entirety as background information. For an advanced discussion of existing compiler and emulation tool technology, see *Advanced Compiler Design and Implementation*, by Steven S. Muchnick (Morgan Kaufmann Publishers, 1997) and *High Performance Compilers for Parallel Computing*, by Michael Wolfe (Addison-Wesley Publishing Company) which are both herein incorporated by reference in their entirety as background information.

Figure 2:
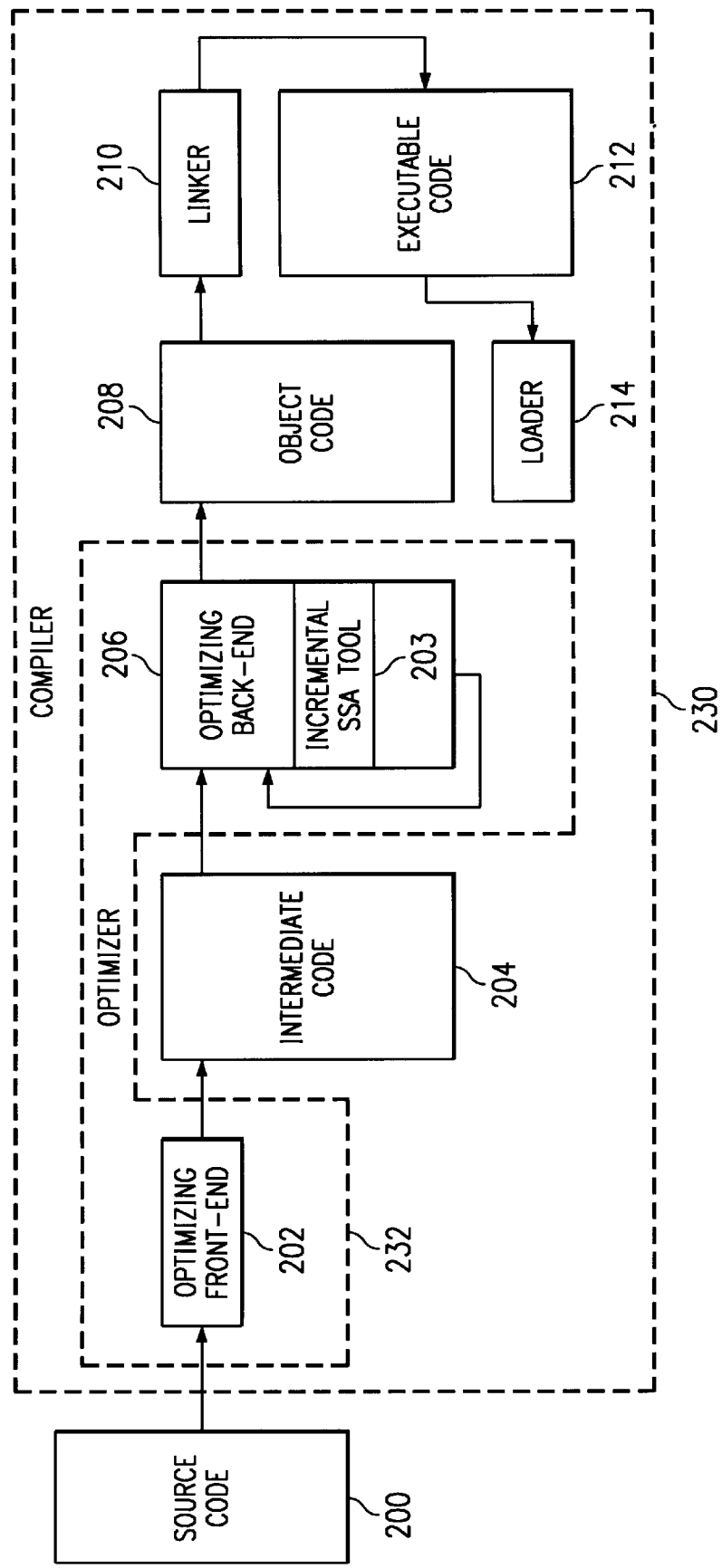
FIG. 2 illustrates a compiler system that operates in a computer system in accordance with one embodiment of the present invention.

FIG. 2 illustrates a form of compiler technology 230 that may use software source code 200 that is generated from an input computer. A software developer may create source code 200 typically in a high-level programming language such as C. A computer system may manage the processing of the source code 200 and may direct the source code 200 to be processed by a compiler 230 that translates the source code 200 into executable code 212 suitable for running on the computer system. The compiler 230 may be comprised of an optimizer 232, a linker 210, and a loader 214.

Executable code 212 that is frequently executed should be small and execute very fast. The compiler 230 may include a compiler optimizer 232 to improve the structure of the executable code 212 such that the executable code 212 executes faster and is smaller than the executable code 212 that would otherwise be generated without the effects of the compiler optimizer 232. The compiler optimizer 232 may be comprised of an optimizing front-end 202 and an optimizing back-end 206. The optimizing front-end 202 may generate intermediate code 204 from the source code 200 and may operate on high-level intermediate code 204. The optimizing front-end 202 may optimize code while preserving the structure and sequence of source operations. For instance, the optimizing front-end 202 may optimize array contents while retaining the array accesses in the source code 200.

The intermediate code 204 may be processed by an optimizing back-end 206. The intermediate code 204 is a list of assembly language instructions and preferably the intermediate code 204 is in SSA form whereby there is a single definition for each variable. The optimizing back-end 206 may include the incremental SSA tool 203 that operates on the intermediate code 204. Examples of such optimizing back-end 206 processing include but are not limited to code motion, elimination of partial redundancies, constant propagation, and the like. The optimizing back-end 206 receives segments of the intermediate code 204 that may no longer be in SSA form. In these cases the optimizing back-end 206 may execute in order to restore the intermediate code 204 into SSA form. Further, the optimizing back-end 206 may execute the intermediate code 204 more than once and thereby may make iterative changes, over one or more than one compiler passes, in the intermediate code 204 to complete the processing by the optimizing back-end 206.

The optimizing back-end 206 may generate object code 208 that includes optimization changes which may be dependent on the particular multi-purpose computer on which the compiler optimizer technology operates. These machine-specific changes may allow the optimizing back-end to generate code that is highly tailored to optimally run on a specific multi-purpose computer; for example different cache memory size access techniques might be used to avoid inadvertent writing to computer memory.

In the compiler 230 the linker 210 may operate on the output of the optimizing back-end 206 which may be object code 208. In order to execute the object code 208 it must be combined with one or more object code modules to create combined user process executable code 212. The combining process is linking. The compiler 230 employs a linker 210 to resolve any undefined computer location references in the object code 208 and to generate executable code 212 capable of executing on an output multi-purpose computer.

The executable code 212 is formatted to enable a loader 214 to load the executable code 212 into the computer registers and memory for instruction execution. The executable code 212 may be any of a variety of known executable files or an executable file of a type to be developed in the future. Examples of such known files are those having an extension of ".exe" operating under a DOS or Windows operating system, an "a.out" file of a UNIX® operating system, and JAVA VIRTUAL MACHINE™ and JAVA CLASS LIBRARIES executable files.

Figure 3:
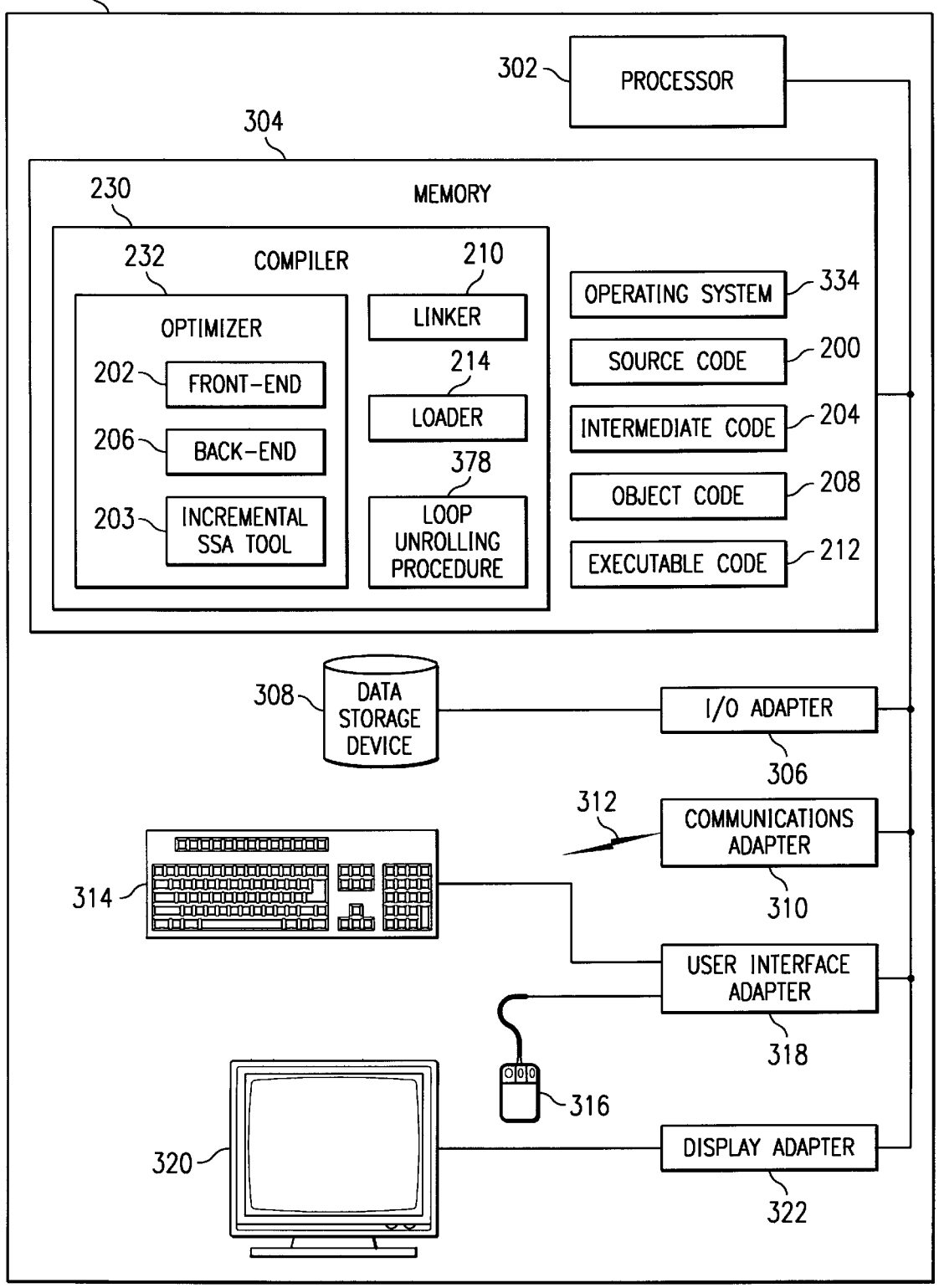
FIG. 3 illustrates a computer system in accordance with one embodiment of the present invention.

FIG. 3 illustrates the computer system 300 and is a block diagram of the hardware and software modules that interoperate in a computer system 300 that executes the incremental SSA tool 203. The computer system 300 includes components such as a processor 302, a memory 304, a data storage device 308, an I/O adapter 306, a communications adapter 310, a communications network 312, a user interface adapter 318, a keyboard 314, a mouse 316, a display adapter 322, and a computer monitor 320. It will be understood by those skilled in the relevant art that there are many possible configurations of the components of the computer system 300 and that some components that may typically be included in the computer system 300 are not shown.

It will be understood by those skilled in the relevant art that the functions ascribed to the incremental SSA tool 203, or any of its functional modules, typically are performed by the central processing unit that is embodied in FIG. 3 as the processor 302 executing such software instructions, typically in cooperation with other modules in the computer system 300 such as the computer operating system (O.S.) 334. Henceforth, the fact of such cooperation among the processor 302, the O.S. 334 and the modules of the invention, whether implemented in software, hardware, firmware, or any combination thereof, may therefore not be repeated or further described, but will be understood to be implied. In particular, the cooperative functions of the O.S. 334, which are well known to those skilled in the relevant art, may be omitted for clarity.

It will also be understood by those skilled in the relevant art that the functions ascribed to the incremental SSA tool 203 and its functional modules, whether implemented in software, hardware, firmware, or any combination thereof, may in some embodiments be included in the functions of the O.S. 334. That is, for example, O.S. 334 may include modules of the incremental SSA tool 203. In such embodiments, the functions of the incremental SSA tool 203 may be described with reference to the execution by the processor 302 but without reference to cooperation with a separate O.S. 334. In such embodiments, the functions ascribed to the incremental SSA tool 203, or any of its functional modules, typically are performed by the processor 302 executing such software instructions in cooperation with aspects of O.S. 334. Therefore, in such embodiments, cooperation by the incremental SSA tool 203 with aspects of an O.S. 334 will not be stated, but will be understood to be implied.

In one aspect of the illustrated embodiment, the processor 302 executes the O.S. 334, and the O.S. 334 interfaces with firmware and hardware in a well-known manner. The O.S. 334 facilitates the processor 302 in coordinating and executing the functions of the other components of the computer system 300. Memory 304 may be any of a variety of known memory storage devices or future memory devices, including, for example, any commonly available random access memory (RAM), cache memory, magnetic medium such as a resident hard disk, or other memory storage device. In one embodiment of the present invention, the O.S. 334 and the incremental SSA tool 203 reside in the memory 304 during execution. Also, the source code 200, the intermediate code 204, the object code 208, and the executable code 212 may all reside in the memory 304 during the operation of the incremental SSA tool 203. The compiler 230 may also reside in the memory 304 during the operation of the incremental SSA tool 203. The compiler 230 may include the optimizer 232, the linker 210, and the loader 214. The compiler 230 may further include a loop unrolling procedure 378 that unrolls loops by any manner known in the art. The optimizer 230 may further include the optimizing front-end 202, the optimizing back-end 206, and the incremental SSA tool 203.

The data storage device 308 may be any of a variety of known or future devices, including a compact disk drive, a tape drive, a removable hard disk drive, or a diskette drive. Any such program storage device may communicate with the I/O adapter 306, that in turn communicates with other components in the computer system 300, to retrieve and store data used by the computer system 300. As will be appreciated, such program storage devices typically include a computer usable storage medium having stored therein a computer software program and data.

Input devices could include any of a variety of known input-output (I/O) devices for accepting information from a user, whether a human or a machine, whether local or remote. Such devices include, for example a keyboard 314, mouse 316, touch-screen display, touch pad, microphone with a voice recognition device, network card, or modem. The input devices may communicate with a user interface I/O adapter 306 that in turn communicates with components in the computer system 200 to process I/O commands. Output devices could include any of a variety of known I/O devices for presenting information to a user, whether a human or a machine, whether local or remote. Such devices include, for example, a video monitor 320, printer, audio speaker with a voice synthesis device, network card, or modem. Output devices such as the monitor 320 may communicate with the components in computer system 300 through the display adapter 322. Input-output devices could also include any of a variety of known data storage devices 308 including a compact disk drive, a tape drive, a removable hard disk drive, or a diskette drive.

By way of illustration, the executable code 212 may typically be loaded through an input device and may be stored on the data storage device 308. A copy of the executable code 212 or portions of it, (hereafter, simply referred to as executable code 212) may alternatively be placed by the processor 302 into the memory 304 for faster execution. In the illustrated embodiment, it will be assumed for clarity that the O.S. 334 causes the processor 302 to place the instructions and data of the executable code 212, constituting what is referred to herein as the user code instructions, or instructions, in the memory 304 for execution.

The computer system 300 may communicate with a network 312 through a communications adapter 310. The network may be a local area network, a wide area network, or another known computer network or future computer network. It will be appreciated that the input-output device used by the incremental SSA tool 203 may be connected to the network 312 through the communications adapter 310 and therefore may not be co-located with the computer system 300. It will be further appreciated that other portions of the computer system, such as the data storage device 308 and the monitor 320, may be connected to the network 312 through the communications adapter 310 and may not be co-located.

The incremental SSA tool 203 may be implemented in the "C" programming language, although it will be understood by those skilled in the relevant art that many other programming languages could also be used. Also, the incremental SSA tool 203 may be implemented in any combination of software, hardware, or firmware. It will be understood by those skilled in the relevant art that the incremental SSA tool 203, or portions of it, may typically be loaded by the processor 302 in a known manner into the memory 304 for execution.

Figure 4:
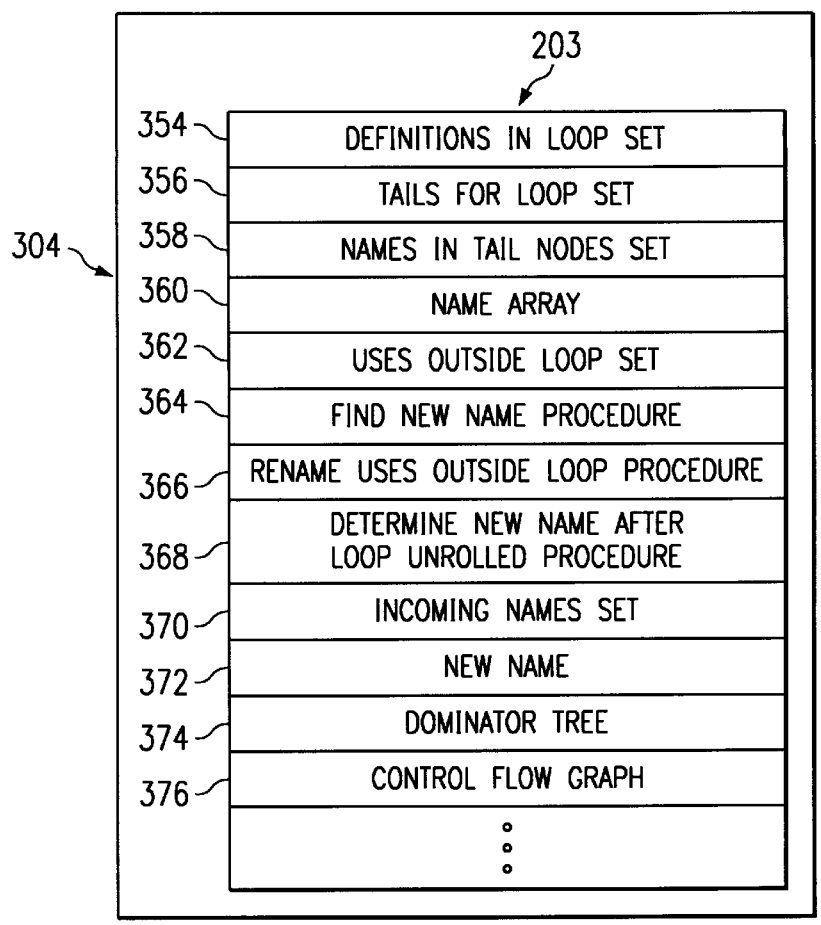
FIG. 4 illustrates the incremental SSA tool as shown in FIG. 3 in accordance with one embodiment of the present invention.

FIG. 4 illustrates data structures and procedures used by the incremental SSA tool 203 and stored in the memory 304. The memory 304 may include the following:

- a definitions in loop set, d ∈ D, 354 that is the set of original names that are defined inside the loop and that are used outside of the loop;
- a tails for loop set, t ∈ T, 356 that is the set of tail nodes, that are associated with the loop;
- a names in tail nodes set, N (d), 358 that includes the original names, d, that are used in the tail nodes;
- a name array, NAME (t,d), 360 that is the array that is maintained to track the new clone name, by the tail node descriptor, t, and the definition name, d;
- a uses outside loop set, u ∈ U, 362 that are the nodes outside the loop in which a definition name, d, is used;
- a find new name procedure, FINDNEWNAME, 364 that determines the new name associated with a node that uses a definition, d;
- a rename uses outside loop procedure 366 that creates a clone name;
- a determine new name after loop unrolled procedure 368 that creates an incarnation name;
- an incoming names set, INCOMINGNAMES, 370 that holds the new names that are found during the processing of the FINDNEWNAME 364 procedure;
- a new name variable data structure, NEWNAME, 372 that temporarily holds the new names during the processing of the FINDNEWNAME 364 procedure;
- a dominator tree 374 data structure that represents the dominance between nodes in a CFG;
- a control flow graph 376 data structure that represents the CFG;
- as well as other data structures and procedures.

The foregoing description has described an exemplary computer system embodying the technology of the incremental SSA tool 203. In addition, an overview of the phases of the compiler embodying the technology of the incremental SSA tool 203 has been described. Attention now turns to the operation of the computer system 300 with particular emphasis on the operation of the incremental SSA tool 203.

In one embodiment, the incremental SSA tool 203 operates on a CFG 376, as described in FIG. 4., that represents the flow of control of program code, where each node represents a basic block and each edge shows a possible path for the flow of control between basic blocks. Further, the incremental SSA tool 203 operates on the basic code blocks, and traverses one instruction at a time. If the first instruction in the basic block is executed, all other instructions in the basic block will be executed. A basic block may also consist of a single instruction. A basic block has at least one exit instruction that passes control from the basic block to a different basic block. The terms "node" and "basic block" will be used interchangeably in this description.

The incremental SSA tool 203 advantageously operates to improve the processing of unrolled loops. The flow of control of a loop may be described by the edges of the loop in which the edge has a head and a tail, and the head dominates the tail. If x→y is an edge, y is the head and x is the tail and we call the edge a back edge. That is, a back edge is the edge wherein the transfer of control from x to y has the property that y dominates x, or whose head dominates its tail.

A property of the SSA form is that each definition must dominate all its uses in the control flow graph of the program. A property for the use of CFG form is that each tail of a loop has only one predecessor. Another important property in SSA form is that identical versions, or names, of the same variable must represent the same value. The representation of data flow such as def-use chains may be made more compact through SSA form. Optimizations that can benefit from SSA form include code motion, elimination of partial redundancies, and constant propagation. The size of a typical SSA form program has a linear relationship to the size of the original program. Similarly, the time to do the work typically has a linear relationship to the SSA size.

Figures 10, 11:
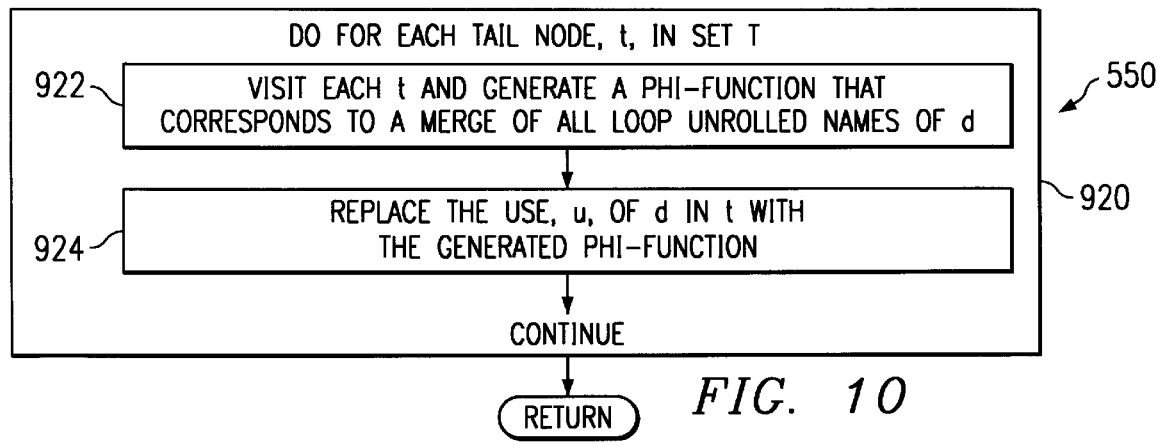
FIG. 10 is a flow chart illustrating the steps of the determine new name after loop unrolled procedure in accordance with one embodiment of the incremental SSA tool.
FIG. 11 is an exemplary pseudo-code source program.
Figure 12:
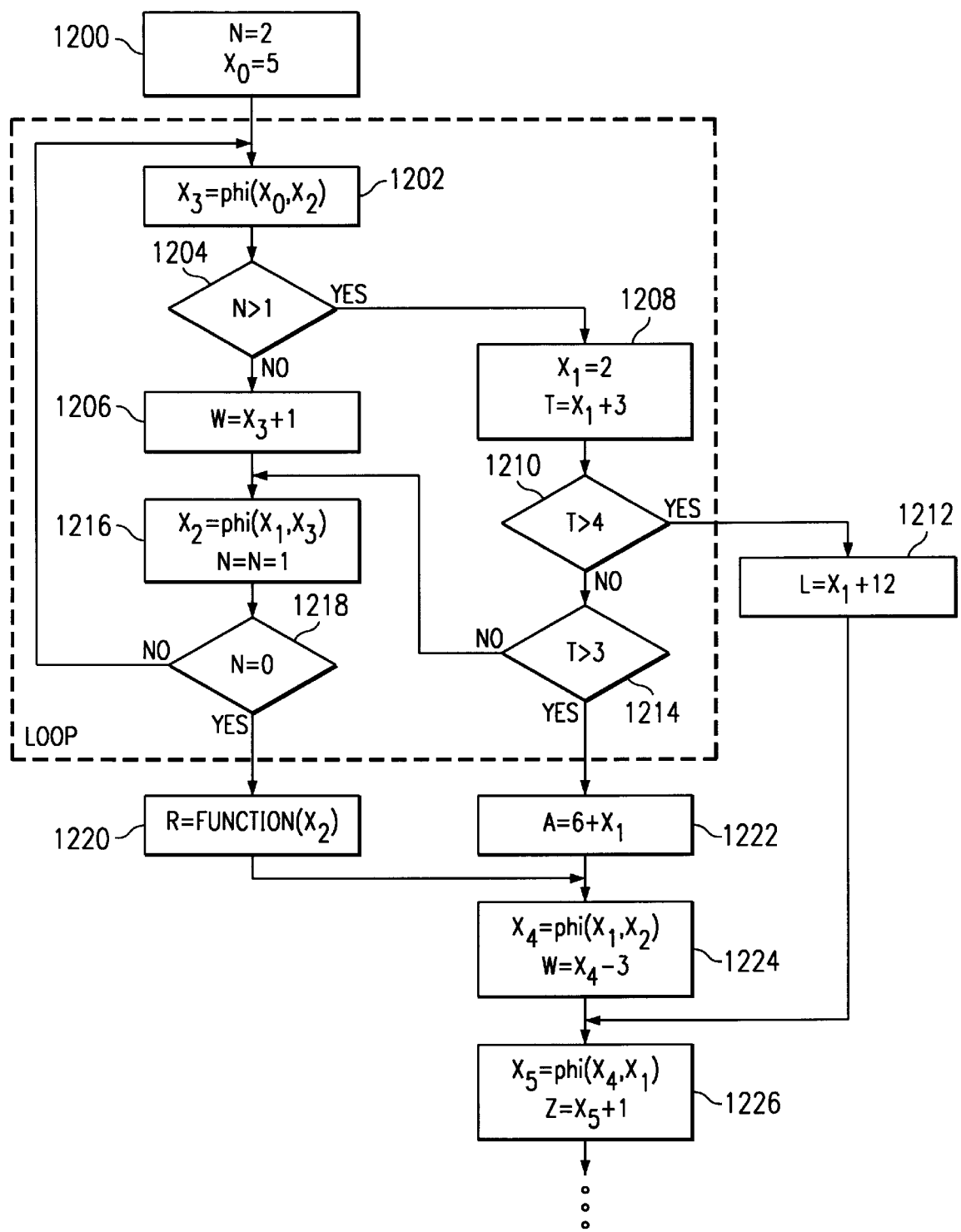
FIG. 12 illustrates a CFG for the exemplary source program of FIG. 11 which is in SSA form.

The operation of the incremental SSA tool 203 will be described below with reference to an exemplary source program shown in FIGS. 11–17. However, it should be noted that this example is for illustration purposes only and does not, in any way, limit the incremental SSA tool 203 to the scenario illustrated in the example. For example, FIG. 11 illustrates the exemplary source program pseudo code 1100 that will be used to illustrate the incremental SSA tool 203. Each line of pseudo code is associated with a specific basic block. The exemplary source program 1100 is represented by the CFG as shown in FIG. 12 which is altered by the incremental SSA tool 203 as shown in FIGS. 14–17.

Figure 5:
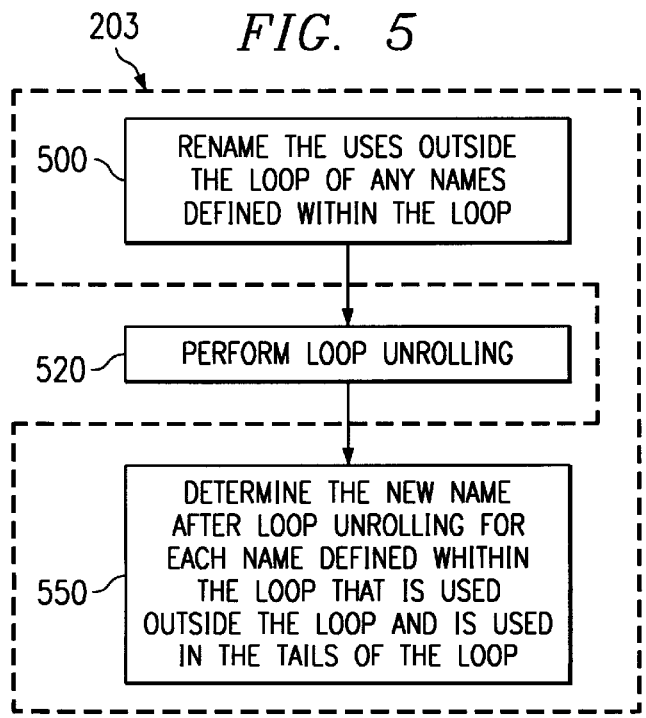
FIG. 5 is a flow chart illustrating the operation of the incremental SSA tool in accordance with one embodiment of the present invention.

FIG. 5 illustrates the method of the incremental SSA tool 203 and includes two steps that are:

- renaming the cloned uses occurring outside of the loop of any names that are originally defined within the loop in step 500, and the step 500 is performed by the rename uses outside loop procedure 366; and
- determining the correct new incarnation name after loop unrolling for each original name defined within the loop, that is also used both outside the loop and that is used in one or more of the tails of the loop, in step 550, and the step 550 is performed by the determine new name after loop unrolled procedure 368.

The rename uses outside loop procedure 366 creates clone names that may be used prior to loop unrolling to describe the original name and the determine new name after loop unrolled procedure 368 creates incarnation names that may be used after loop unrolling to describe the original name. By creating clone names and incarnation names, the name resolution between names of the variable used outside of the loop and the name of the variable defined within the loop occurs at the tail nodes of the loop, thereby creating a boundary between the names defined inside of the loop and the used names outside of the loop. Also, by creating clone names before loop unrolling and incarnation names after loop unrolling, the method of renaming is more efficient than in the past by enabling an incremental update procedure. This boundary simplifies the maintenance of the SSA form by resolving the names defined inside of the loop and the used names outside of the loop by an incremental update procedure which requires less compiler overhead than evaluating the names afresh as was done in the prior art.

Before loop unrolling in step 500, the rename uses outside loop procedure 366 creates the clone name and adds the clone name to the uses of the original name outside of the loop. The loop unrolling procedure 378 further performs loop unrolling, in step 520, by any manner currently known in the art. The determine new name after loop unrolled procedure 368 determines the correct new incarnation name after loop unrolling for each original name defined within the loop, that is also used both outside the loop and in one or more of the tails of the loop, in step 550. Step 500 will be described in more detail in FIGS. 6–9, and step 550 will be described in more detail in FIG. 10.

Figure 6:
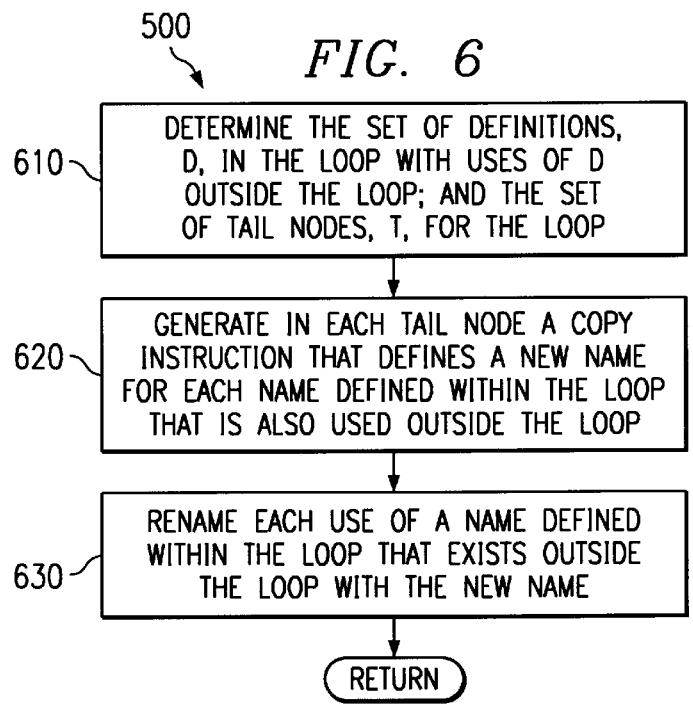
FIGS. 6–9 are flow charts illustrating the steps of the rename uses outside loop procedure in accordance with one embodiment of the incremental SSA tool.

FIG. 6 illustrates, with more particularity, step 500 in which the incremental SSA tool 203 renames the uses occurring outside of the loop of any names that are defined within the loop. The rename uses outside loop procedure 366 performs initializing functions by determining, in step 610, the definitions in loop set, $d \in D$ 354 that are used outside of the loop and the tails for loop set, $t \in T$ 356. For the example as shown in FIG. 12, $D \in \{X_1, X_2\}$ and $T \in \{$node 1212, node 1220, and node 1222$\}$.

Figure 14:
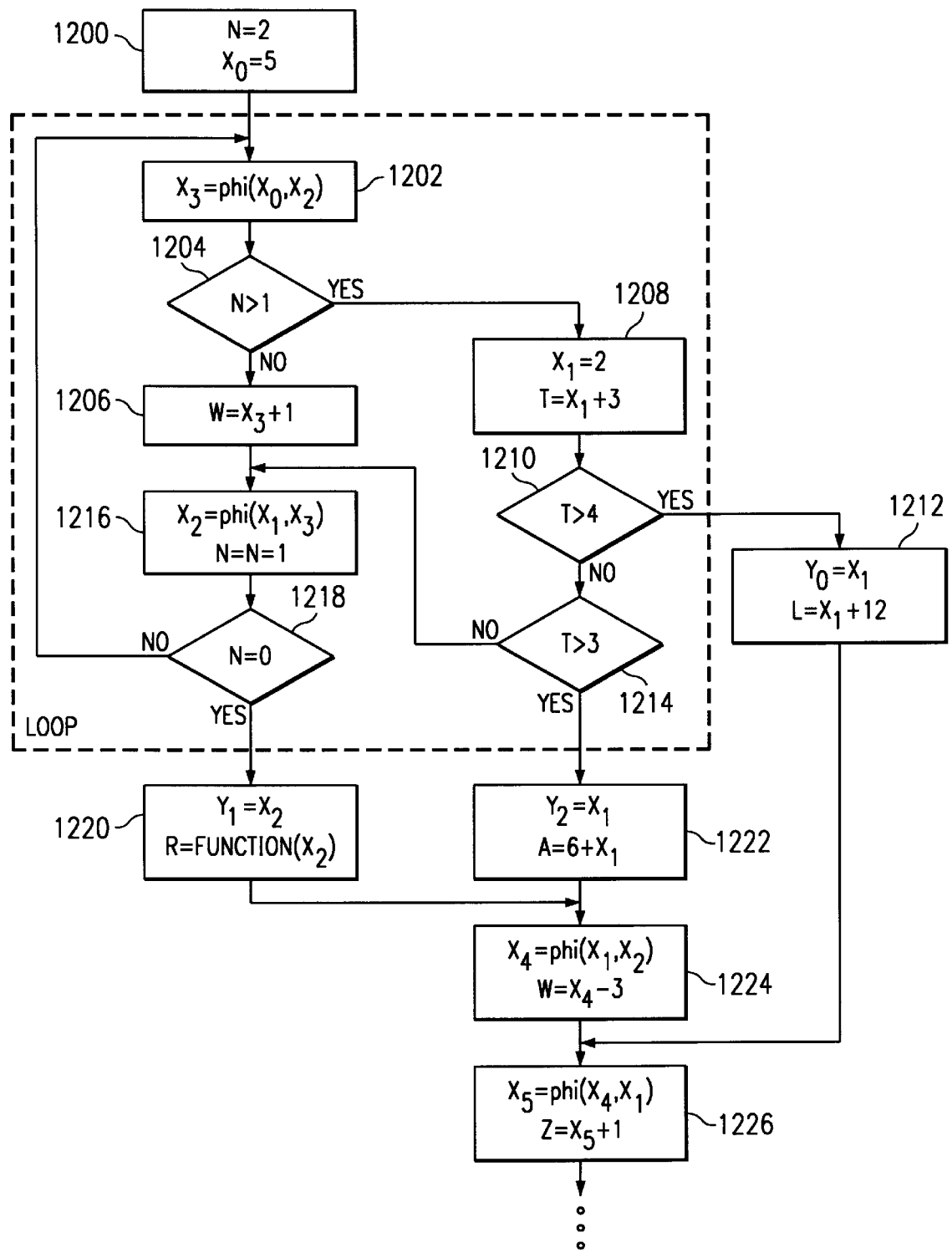
FIGS. 14–16 illustrate the operation of the rename uses outside loop procedure as applied to the exemplary source program shown in FIG. 12.
Figure 15:
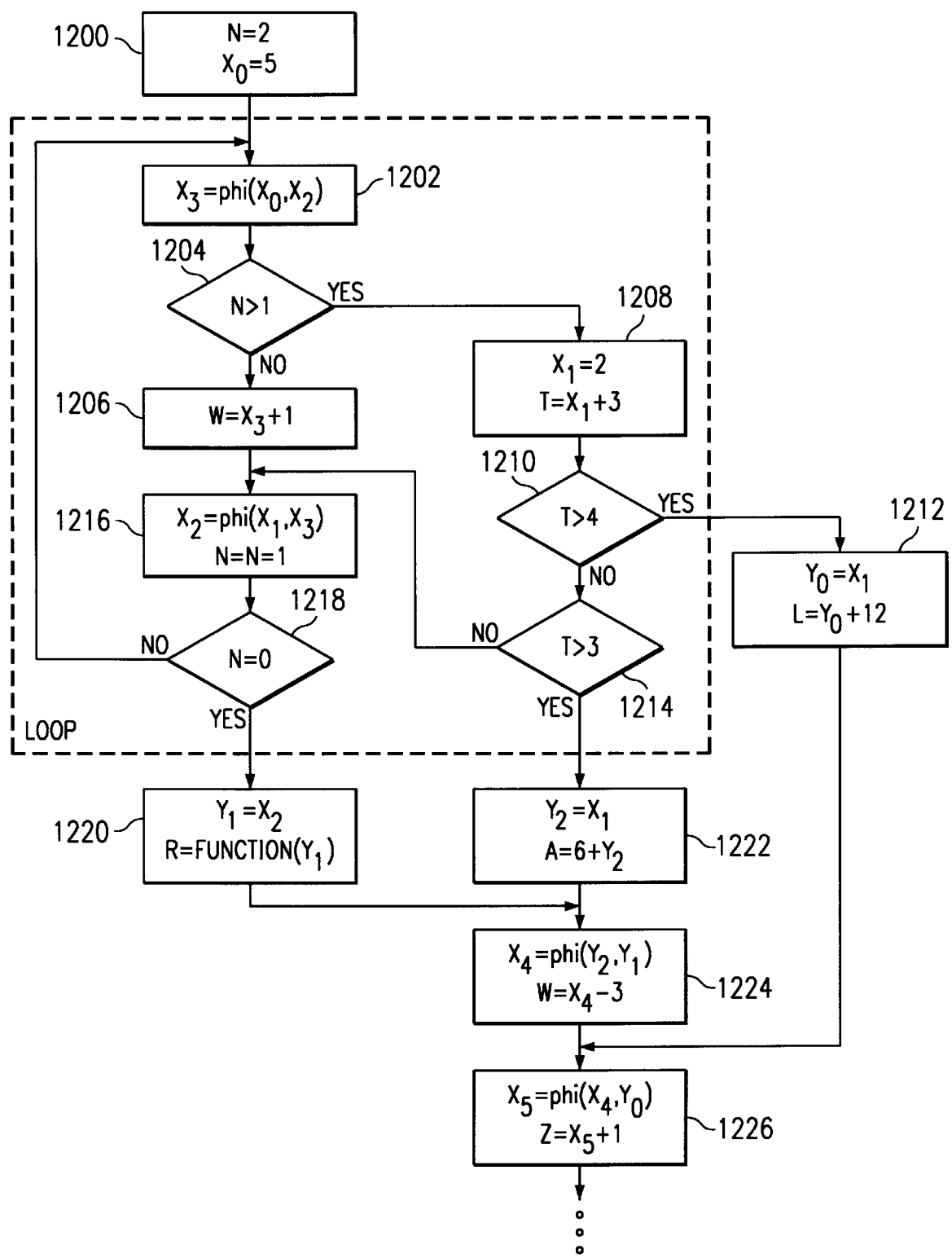

After initialization is complete, in step 620 the rename uses outside loop procedure 366 generates in each tail node, T, a copy instruction that defines a new name for each name that is defined within the loop and that is also used outside of the loop. FIG. 14 shows the placement of the copy instruction in each tail node. In node 1212, the copy instruction "$Y_0 = X_1$" is inserted, in node 1220, the copy instruction "$Y_1 = X_2$" is inserted, and in node 1222, the copy instruction "$Y_2 = X_1$" is inserted. In step 630, the rename uses outside loop procedure 366 then renames each use of a name defined within the loop that exists outside of the loop with the new name. Step 630 is described in more detail in FIGS. 8 and 9. FIG. 15 illustrates the effect of the rename operation: in node 1212, the clone variable $X_1$ is renamed to $Y_0$; in node 1220, the clone variable $X_2$ is renamed to $Y_1$; in node 1222, the clone variable $X_1$ is renamed to $Y_2$; in node 1224, the clone variable $X_1$ is renamed to $Y_2$ and the clone variable $X_2$ is renamed to $Y_1$; and in node 1226, the clone variable $X_1$ is renamed to $Y_0$.

Figure 7:
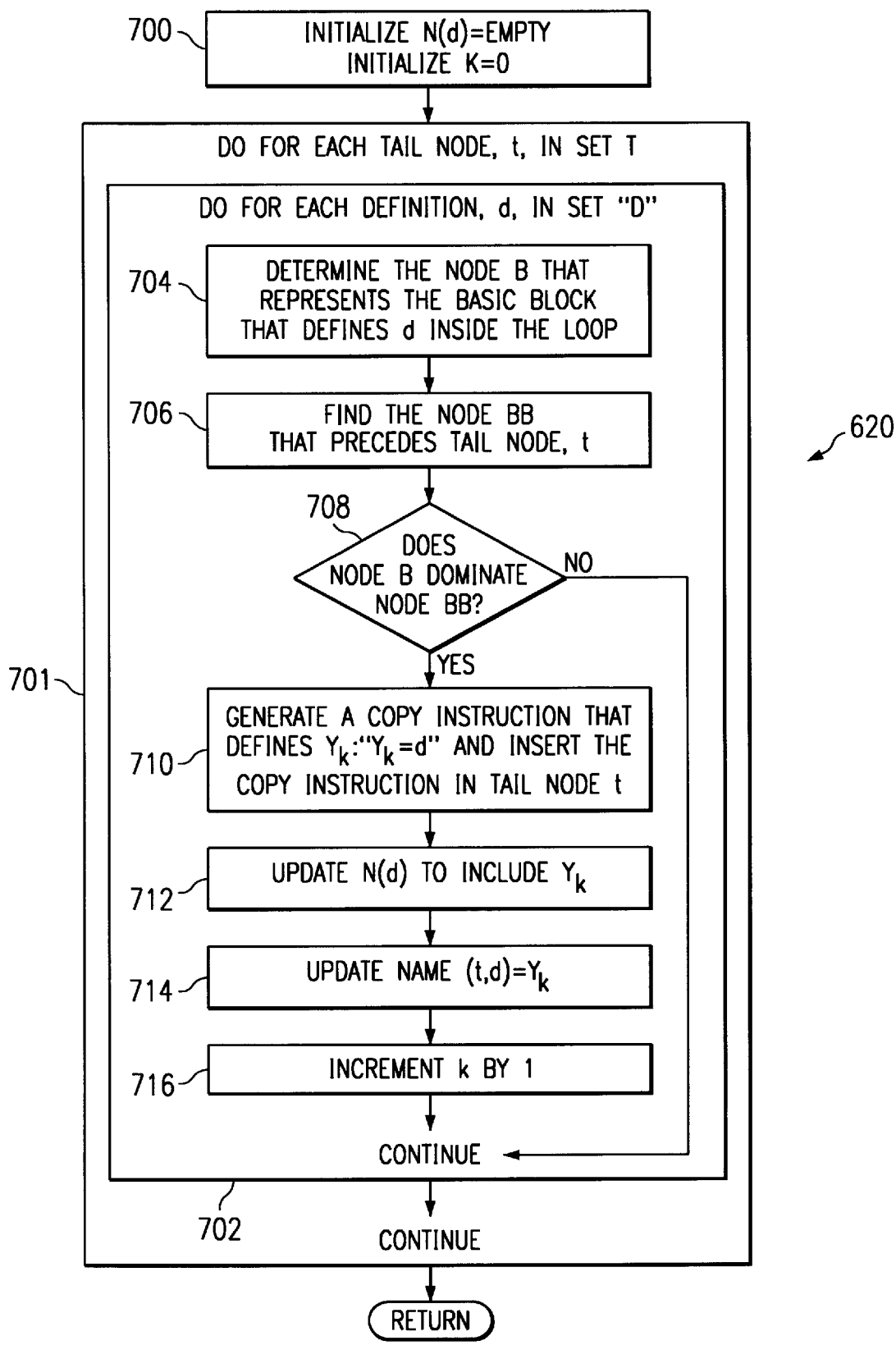

FIG. 7 illustrates, in more detail, step 620 in which a copy instruction that creates a new cloned name for each original name that is defined within the loop and that is also used outside of the loop, and the copy instruction is inserted into each tail node. In step 700, the rename uses outside loop procedure 366 establishes a set of names, N (d) 358, that are generated in the tail nodes, T 356, for each d from the set, D 354 of definitions that are defined within the loop and that are used outside the loop. The rename uses outside loop procedure 366 initializes the set N(d) 358 to empty. In step 700 a counter, "k" is established to use in creating the new clone names that are copied into the tail nodes of the loop, and k is set to zero.

Next, in step 701 a loop is established to process each tail node, t in T 356. Inside of the loop in step 701, another loop is established in step 702 to process each definition, d. Within both of the loops, from steps 701 and 702, the rename uses outside loop procedure 366 now determines in step 704 the node, "B", that represents the basic block that defines the original name inside the loop. In step 706 the rename uses outside loop procedure 366 next finds the predecessor node, "BB" of the tail node, t, currently being processed.

Now, in step 708, the rename uses outside loop procedure 366 determines whether B dominates BB. If B does not dominate BB (step 708—NO) the next original name, d, is processed by jumping to the end of the loop defined in step 702 and beginning a new incarnation of the loop. If B dominates BB (step 708—YES) then in step 710 the rename uses outside loop procedure 366 generates a copy instruction that defines $Y_k = d$ and inserts the copy instruction into the tail node, t. Then a number of bookkeeping activities are completed in steps 712, 714, and 716. In step 712 the set N(d) 358 updated to include $Y_k$. In step 714 an array NAME (t,d), 360 is updated with $Y_k$. NAME 360 is an array that is maintained to track the new names by their tail node descriptor, t, and their definition name, d. In step 716, the variable k is incremented by one.

Referring to the example shown in FIG. 12, step 701 starts with tail node 1212 and step 702 starts with $d \in X_1$. At step 704, B=node 1208 and at step 706 BB=1210. Since node 1208 dominates node 1210 (step 708—YES), the instruction $Y_0 = X_1$ is inserted in tail node 1212 in step 710. Next N ($X_1$) is updated to include $Y_0$ in step 712, NAME (1212,$X_1$)=$Y_0$ in step 714, and k is incremented to 1 in step 716.

Step 702 is iterated with $d \in X_2$ and $t \in$ node 1212. Here B=node 1216 (step 704) and BB=1210 (step 706). Since node 1216 does not dominate node 1210 (step 706—NO) the loop continues to the next tail node.

Referring to the example shown in FIG. 12, step 701 now continues with tail node 1220 and step 702 starts with $d \in X_1$. At step 704, B=node 1208 and at step 706 BB=1218. Since node 1208 does not dominate node 1218 (step 708—NO) the loop continues to process the next $d \in D$ 354 which is $X_2$.

Step 702 is iterated with $d \in X_2$ and $t \in$ node 1220. Here B=node 1216 (step 704) and BB=node 1218 (step 706). Since node 1216 dominates node 1218 (step 708—YES), the instruction $Y_1 = X_2$ is inserted into tail node 1220. Next N ($X_2$) is updated to include $Y_1$ in step 712, NAME (1220, $X_2$)=$Y_1$ in step 714, and k is incremented to 2 in step 716.

Referring again to the example shown in FIG. 12, step 701 continues with tail node 1222 and step 702 starts with $d \in X_1$. At step 704, B=node 1208 and at step 706 BB=1214. Since node 1208 dominates node 1214 (step 708—YES), the instruction $Y_2 = X_1$ is inserted in tail node 1222 in step 710. Next N($X_1$) is updated to include $Y_2$ in step 712, NAME (1222,$X_1$)=$Y_2$ in step 714, and k is incremented to 3 in step 716.

Step 702 is iterated with $d \in X_2$ and $t \in$ node 1222. Here B=node 1216 (step 704) and BB=1214 (step 706). Since node 1216 does not dominate node 1214 (step 706—NO) and there are no more tail nodes to process, the loops 701 and 702 are exited, and FIG. 14 therefore illustrates the completion of step 620.

Figure 8:
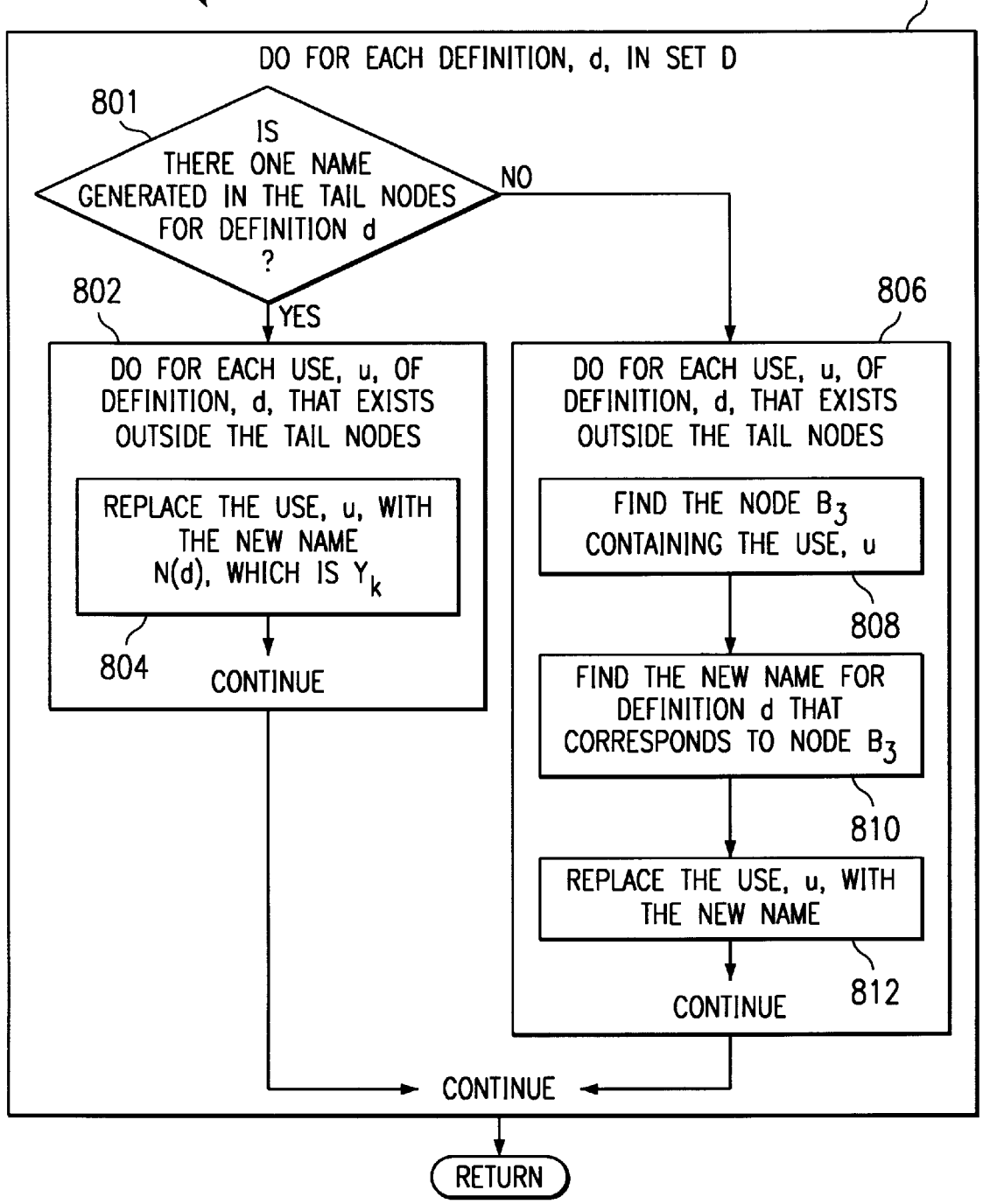

FIG. 8 illustrates in detail step 630 in which the rename uses outside loop procedure 366 will begin upon the completion of the processing of step 620. The rename uses outside loop procedure 366, in step 800, establishes a loop to process each definition, d. Continuing to use the example now described in FIG. 15, the same three tail nodes, 1212, 1220, and 1222 as were used in FIG. 14 are used in the exemplary source program to illustrate the renaming process.

In step 801 it is determined whether there is one name that has been generated in the tail nodes for d by accessing the contents of N (d) 358. If there is one name then, in step 802, a loop is established to process each use, $u \in U$ 362, of d that exists outside the tail nodes of the loop. In step 804, each use, u, is replaced with the new name in N (d) 358 which is also $Y_k$.

If, in step 801, it is determined that there is not one name that has been generated in the tail nodes for d by accessing the contents of N (d) 358 then a loop is established in step 806 to process each use, u, of d that exists outside the tail nodes of the loop. In step 808, the node, "$B_3$", containing the use, u, is located. For example, as described in FIG. 15, in step 801 it is determined that there are two names for the definition of $X_1$ in the tail nodes, since N $(X_1)=\{Y_0,Y_2\}$. Therefore, as described in step 806 each use, u, of $X_1$ outside of the tail nodes is processed. As described in step 808, the node, B3, containing a use of $X_1$ in the example in FIG. 15 is in node 1224 and another use of $X_1$ is in node 1226.

In step 810 the new name for the definition, d, that corresponds to $B_3$ is determined. Step 810 is illustrated in more detail in FIG. 9. After the new name is determined in step 810, the use, u, is replaced with the new name in step 812. Therefore, for example as described in FIG. 15, in node 1212, $Y_0=X_1$ and now $L=Y_0+12$ since $X_1$ has been renamed to $Y_0$. Also, in node 1220, $Y_1=X_2$ and now R=FUNCTION $(Y_1)$ since $X_2$ has been renamed to $Y_1$. Finally, in node 1222, $Y_2=X_1$ and now $A=6+Y_2$ as $X_1$ has been renamed to $Y_2$. Since $X_1$ and $X_2$ are used after the processing of the tail nodes in nodes 1224 and 1226, they will also be renamed and the renaming process will be described in more detail in FIG. 9.

Figure 9:
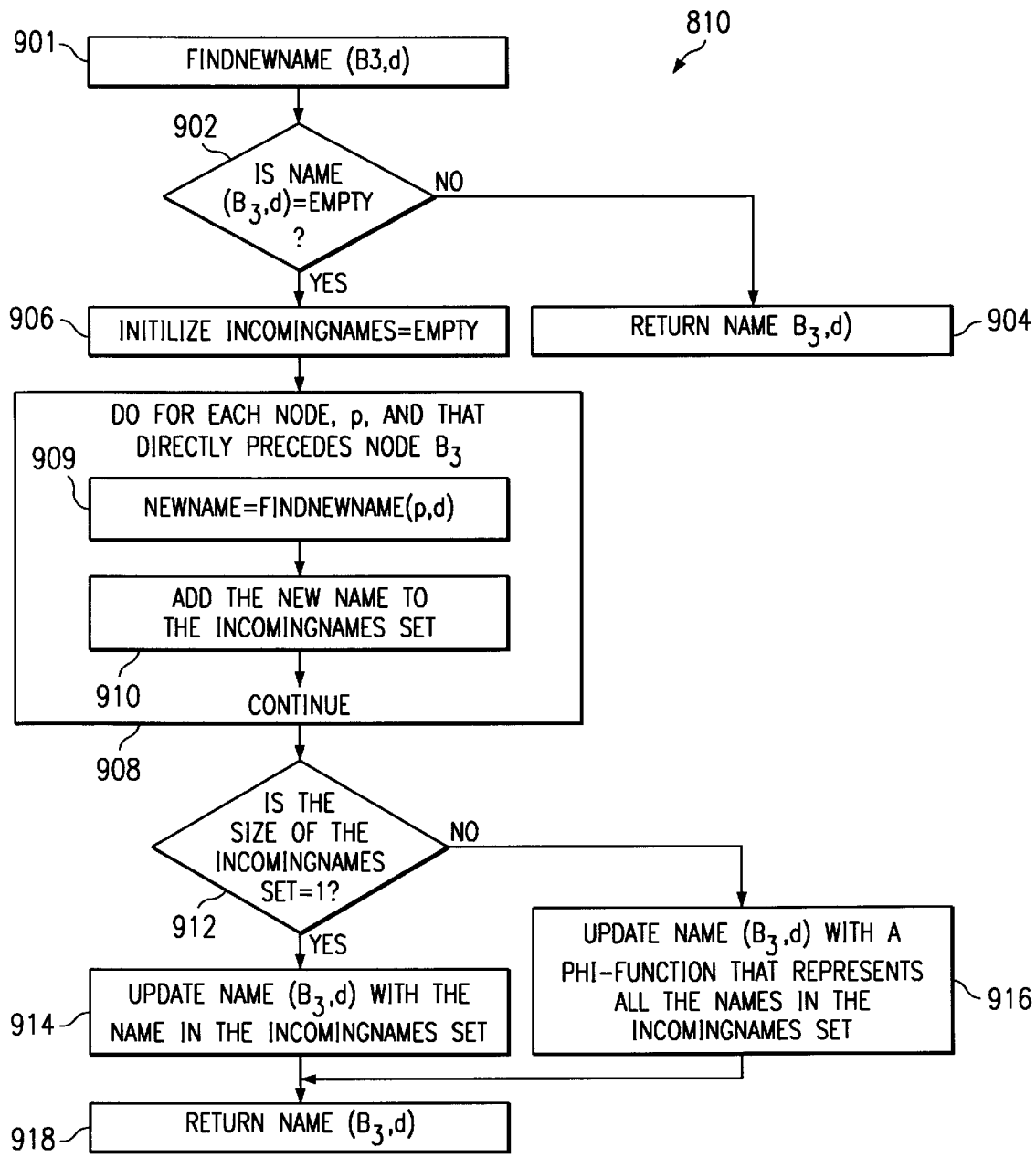

FIG. 9 illustrates the process of determining the new name for the definition, d, that corresponds to $B_3$ as described in step 810 in FIG. 8. In step 901 the FINDNEWNAME 364 function is called with parameters $B_3$ and d. In step 902 it is determined whether the array reference in NAME 360 for $B_3$ and d is empty. If it is not empty, the name in NAME ($B_3$, d) 360 is returned in step 904. If on the other hand, NAME ($B_3$, d) 360 is empty, as determined in step 902, the rename uses outside loop procedure 366 initializes the INCOMINGNAMES set 370 to empty. INCOMINGNAMES 370 is a set that holds the new names that are found that correspond to $B_3$ and d. A loop is established in step 908 that processes each node, "p", if p directly precedes $B_3$. In step 909 the variable, NEWNAME 372 is set to the result of a function call to FINDNEWNAME (p,d) 364. The NEWNAME 372 that is returned from step 909 is added, in step 910, to the INCOMINGNAMES set 370.

After the loop in step 908 has processed, in step 912 it is determined whether the size of the INCOMINGNAMES set 370 is equal to 1. If the size of INCOMINGNAMES 370 is equal to 1 then in step 914, NAME ($B_3$,d) 360 is updated with the name in the INCOMINGNAMES set 370. On the other hand, in step 916, if the size of the INCOMINGNAMES set 370 is not equal to 1 then NAME ($B_3$,d) 360 is updated with a phi-function that merges all the names in the INCOMINGNAMES set 370. From either step 914 or step 916, the incremental SSA tool 203, in step 918, returns the NAME ($B_3$,d) 360 to step 810, as shown in FIG. 8.

For example, as described in FIG. 15 the predecessor nodes of the node 1224 are 1220 and 1222. Further, since $Y_2=X_1$ in node 1222, the use of $X_1$ in node 1224 is replaced with $Y_2$. Similarly with respect to $X_2$, the predecessor node 1220 of node 1224 contains a definition of $Y_1=X_2$. Therefore, by substituting the clone names for $X_1$ and $X_2$ in node 1224, $X_4=\Phi((Y_1,Y_2)$.

Figure 16:
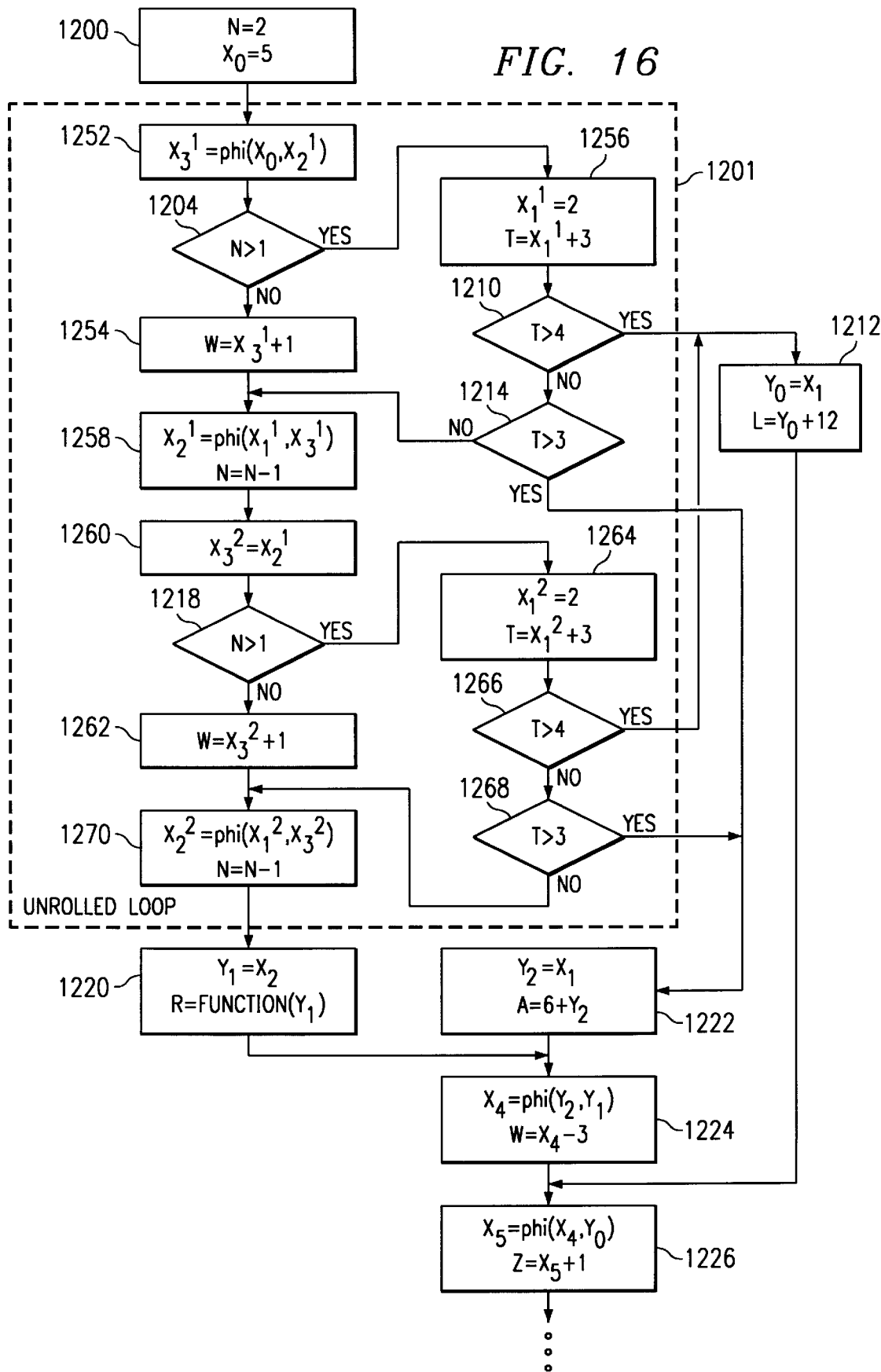
Figure 17:
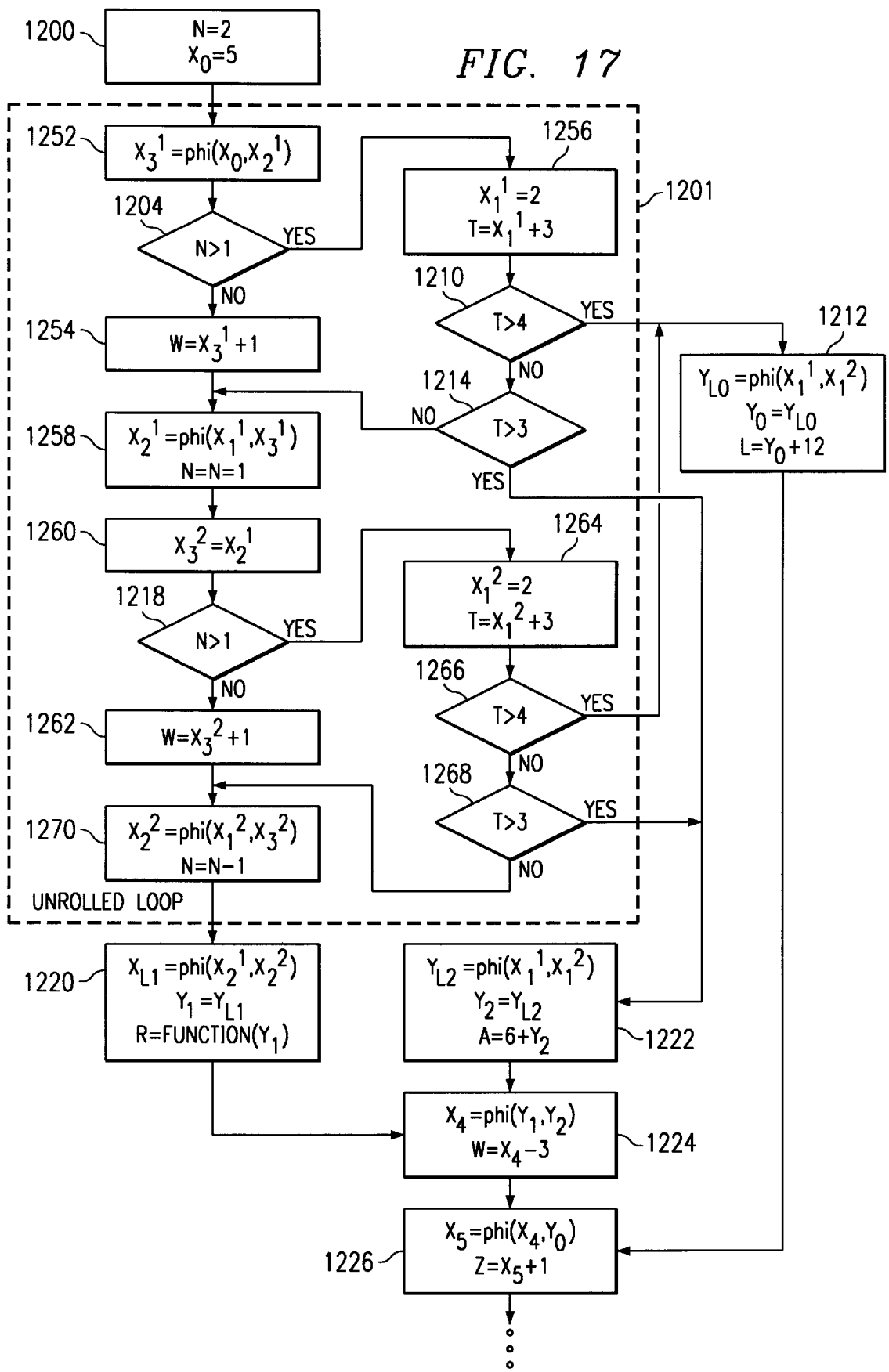
FIG. 17 illustrates the operation of the determine new name after loop unrolled procedure as applied to the exemplary source program shown in FIG. 12.

FIG. 10 illustrates in more detail step 550, as shown in FIG. 5. In step 550 the determine new name after loop unrolled procedure 368 determines the correct new name after loop unrolling for each name defined within the loop, that is also used both outside the loop and in one or more of the tails of the loop. For instance, FIG. 16 illustrates the exemplary source program after the loop unrolling procedure 378 has unrolled the loop twice. Therefore, in node 1200, which is not included in the loop, the statements in the node 1200 have not been changed and they remain N=2 and $X_0=5$. As processing continues, the loop is entered at node 1252 and since the first incarnation of the loop is processing, and the loop incarnation is herein represented by a superscript, $X_3^1=\Phi(X_0, X_2^1)$. Processing continues to node 1204 which remains unchanged, N>1. If N is greater than 1 in node 1204, then processing continues to 1256, and processing is still in the first loop incarnation. Therefore the statements in node 1256 become $X_1^1=2$ and then $T=X_1^1+3$. While still inside the unrolled loop, nodes 1210 and 1214 remain unchanged. Alternatively, if in node 1204 N was not greater than 1, processing moves to node 1254 and since processing is still in the first loop incarnation node 1254 becomes $W=X_3^1+1$. Now node 1258 can be reached by either node 1214 or node 1254. Node 1258 is the last node in the first incarnation of the loop and includes the statements $X_2^1=\Phi((X_1^1,X_3^1)$ and then N=N−1, and therefore N now equals 1 in the exemplary program.

Further describing the exemplary source program of the unrolled loop 1201, by the loop unrolling procedure 378, as described in FIG. 16, after node 1258 the start of the next loop incarnation begins with node 1260 which includes the statement $X_3^2=X_2^1$. The loop processing next moves to node 1218 which, like node 1204, tests whether N is greater than 1. If N is greater than 1 processing moves to node 1264 in which statements $X_1^2=2$ and then $T=X_1^2+3$ are processed. From node 1264 processing moves to node 1266 which is equivalent to node 1210 and on to node 1268 which is similarly equivalent to node 1214. Alternatively, if N was not greater than 1 in node 1218 processing moves to node 1262 where $W=X_3^2+1$. Now node 1270 can be reached by either node 1262 or node 1268. Node 1270 is still part of the second incarnation of the loop and therefore the statements in node 1270 include $X_2^2=\Phi(X_1^2,X_3^2)$ and then N=N−1, and therefore N equals 0 and the loop processing is completed. It will be appreciated that, as a consequence of the loop unrolling a result of "true" from the similar tests in nodes 1210 and 1266 will both reach node 1212. Also a result of "true" from the similar tests in nodes 1214 and 1268 will both reach node 1222. The loop unrolled CFG 376 as illustrated in FIG. 16 is now ready for further processing by the determine new name after loop unrolled procedure 368 of the incremental SSA tool 203.

The determine new name after loop unrolled procedure 368, in step 920, establishes a loop to process each tail node, t, in the set T 356. In step 922 each t is visited and a phi-function is generated that merges all the loop unrolled incarnation names of d. For example, as described in FIG. 17, the determine new name after loop unrolled procedure 368 in node 1212 renames the copy instruction, $Y_0=X_1$, to reflect the first and second incarnations of the loop. Therefore in step 922 the determine new name after loop unrolled procedure 368 inserts a phi-function to merge $X_1^1$ and $X_1^2$. That is, the new name after loop unrolled procedure 368 inserts the phi-function, $Y_{L0}=\Phi(X_1^1,X_1^2)$ into node 1212.

Further, the determine new name after loop unrolled procedure 368 replaces the use of the defined name, which in the present example is $Y_0$ with $Y_{L0}$ which is the new name that reflects the first and second incarnation of the loop. Similarly, in node 1220, $Y_{L1}=\Phi(X_2^1,X_2^2)$ and $Y_1=Y_{L1}$. Finally, in node 1222, $Y_{L2}=\Phi(X_1^1,X_1^2)$ and $Y_2=Y_{L2}$.

Figure 13:
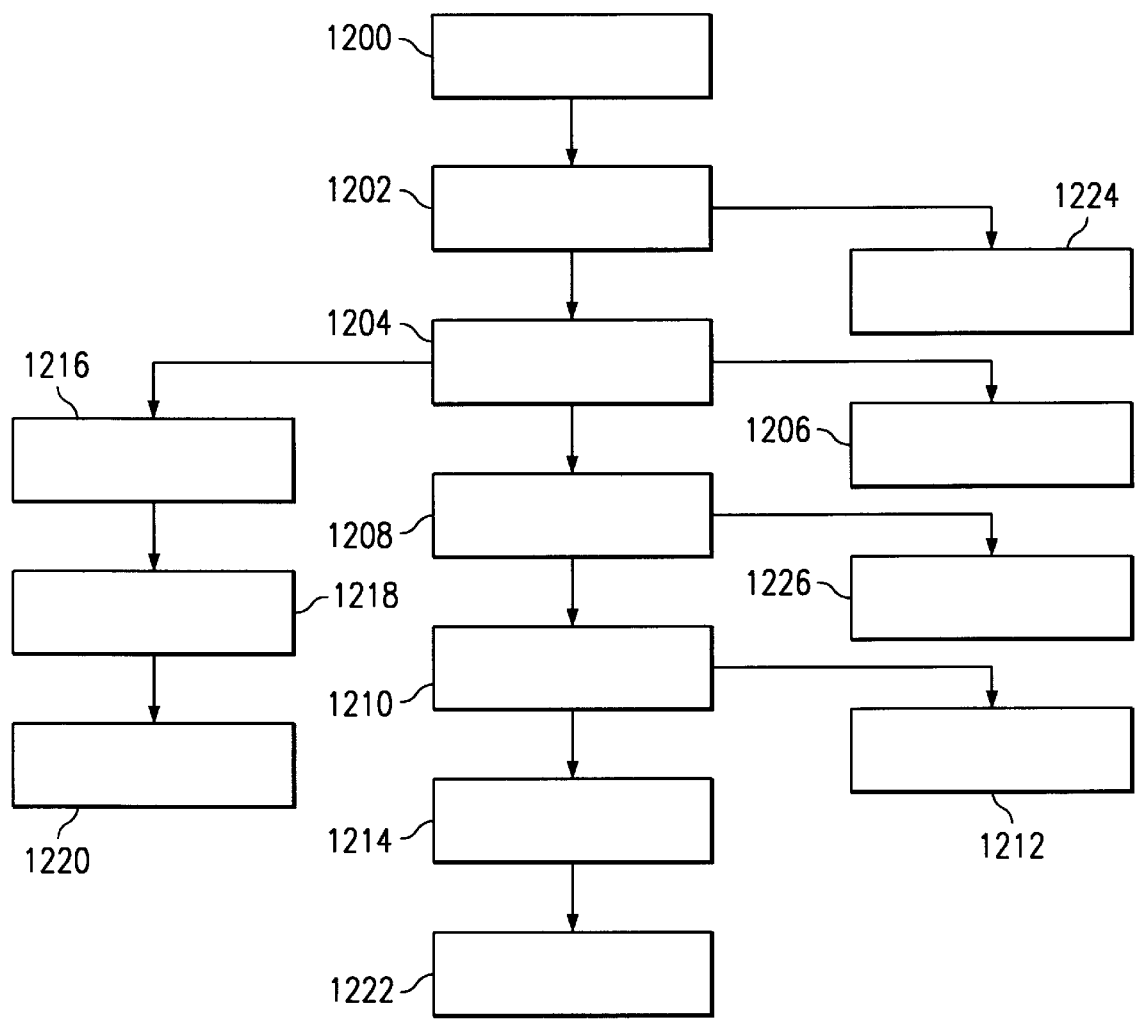
FIG. 13 illustrates a dominator tree for the CFG illustrated in FIG. 12.

It will be appreciated that the incremental SSA tool 203, as illustrated in FIG. 13, also advantageously uses information from a dominator tree, 374 as described in FIG. 4, for the CFG 376 illustrated in FIG. 12. Recall that a node $n_1$ dominates another node $n_2$ if every possible execution path from the entry to $n_2$ contains $n_1$. Therefore, node 1200 dominates node 1202, and similarly node 1202 dominates node 1204 and node 1224. Node 1204 dominates node 1206, node 1208, and node 1216. Node 1208 dominates node 1226 and node 1210. Node 1210 dominates nodes 1212 and 1214. Further node 1214 dominates node 1222. Node 1216 dominates node 1218 which dominates node 1220.

The incremental SSA tool generates a non-ambiguous new name, in SSA form, for each original name defined in a loop and used outside of the loop after loop unrolling, by using the existing CFG structure and dominator tree for the software code that is created by the compiler. The incremental SSA tool renames the uses in the tails of the loop of a name defined within the loop into new clone names. The incremental SSA tool uses the new clone names created in the tails of the loop to rename other uses outside of the loop, of names that are defined within the loop, into new clone names. Also, the incremental SSA tool reconciles loop unrolled names that are used outside of the loop with the new clone names by creating new incarnation names.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the incremental SSA tool are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

In this detailed description, references are made to various functional modules of the incremental SSA tool that may be implemented either in software, hardware, firmware, or any combination thereof. For convenience of illustration, references generally are made to implementations in software. Such references therefore typically refer to software-implemented functional modules that will be understood to comprise sets of software instructions that cause described functions to be performed.

It should be noted that the incremental SSA tool is not constrained to the computer system shown in FIG. 3 and can be practiced without the specific details and may be implemented in various configurations, or makes or models of tightly-coupled processors, in various configurations of loosely-coupled microprocessor systems, and the like.

Further, the method and system described herein above is amenable for execution on various types of executable mediums other than a memory device such as a random access memory. Other types of executable mediums such can be used, such as but not limited to, a computer readable storage medium which can be any memory device, compact disc, floppy disk, or the like.

The technology of the incremental SSA tool has been described with respect to program transformations that incrementally update loop unrolled names into SSA form. However, the incremental SSA tool has wider application than the particular case illustrated herein.

What is claimed is:

1. A computer implemented method for optimizing in a source program that executes on a computer, comprising: representing the source program having at least one loop, and at least one instruction having at least one variable, by a graph including a plurality of nodes, each node including at least one of the instructions, having the following steps:
   a. including a definition instruction, that establishes at least one original name variable, at least one cloned name variable, or at least one incarnation name variable;
   b. including a use instruction that includes use of the original name, use of the cloned name, or use of the incarnation name;
   c. maintaining correspondence between the cloned name and the original name;
   d. including a set of at least one first instruction that identifies nodes having the definition instructions and the identified nodes are inside of the loop;
   e. including a set of at least one second instruction that identifies nodes having the use instructions and the identified nodes being outside of the loop;
   f. including a set of at least one tail node;
   g. including a set of at least one third instruction having the original names that are in both the first instruction set and the second instruction set;
   h. wherein, for each tail node in the set of tail nodes:
      i. wherein, when the original name is in the tail node and the third instruction set, inserting in the tail node a cloned definition instruction that establishes the cloned name by the correspondence to the original name; and
      ii. wherein, for all the use instructions that are also in the second instruction set, when the original name is used, and when the cloned name is established in the cloned definition instruction, replacing the original name with the corresponding cloned name; and
   i. generating an executable module from the graph that executes on the computer thereby optimizing the source program that executes on the computer with the cloned name.

2. The method for optimizing a source program as set forth in claim 1, wherein step (h), further comprises:
   iii. wherein, when the loop is unrolled:
      a. including a first variable that represents the number of times the loop is unrolled;
      b. maintaining correspondence between the incarnation name and the cloned name;
      c. wherein, for each time the loop is unrolled:
         i. setting the first variable to the number of times the loop has been unrolled; and
         ii. including at least one second variable by inserting the first variable and the incarnation name into the second variable to maintain correspondence between the incarnation name and the first variable; and
      d. merging the second variables into the corresponding cloned name thereby optimizing the source program that executes on the computer with the cloned name when the loop is unrolled.

3. The method for optimizing a source program as set forth in claim 1, wherein step (h), further comprises:
   iii. wherein, when the loop is unrolled:

a. maintaining correspondence between the incarnation name and the cloned name;
b. wherein, for each time the loop is unrolled maintaining a third variable corresponding to each time the loop is unrolled and the incarnation name; and
c. merging the third variables into the incarnation name thereby optimizing the source program that executes on the computer with the incarnation name when the loop is unrolled.

4. The method for optimizing a source program as set forth in claim 1, wherein step h(i) further comprises:
wherein, for each of the definition instructions that is in the third set:
a. including a fourth variable that corresponds to the definition instruction;
b. including a definition node that includes the definition instruction;
c. including a precedessor node that precedes the tail node; and
d. wherein, if the definition node dominates the precedessor node, inserting the fourth variable into the cloned name thereby optimizing the source program that executes on the computer by establishing dominance.

5. The method for optimizing a source program as set forth in claim 1, wherein replacing the original name with the corresponding cloned name in step h(ii) further comprises:
a. establishing when the correspondence of all uses of the original name that are also in the second instruction set, is between one of the cloned names; and
b. replacing the all uses of the original name with the one cloned name thereby optimizing the source program that executes on the computer by using the one cloned name.

6. The method for optimizing a source program as set forth in claim 1, wherein replacing the original name with the corresponding cloned name in step h(ii), further comprises:
establishing when the correspondence of the all uses of the original name that are also in the second instruction set, is between more than one of the cloned names, and for each of the use instructions that is in the second instruction set and that is not in the tail node set:
1. including an incoming names set;
2. including a fourth instruction that corresponds to the use instruction that is the second instruction set and that is not in the tail node set;
3. including a first node that includes the fourth instruction and that includes use of at least one of the original names;
4. wherein, for each node that precedes the first node:
   i. labeling the node that precedes the first node as a second node;
   ii. including a new name variable;
   iii. searching in the second node for the correspondence between the original name and the cloned name;
   iv. assigning the new name the cloned name when the correspondence between the original name and the cloned name is found;
   v. adding the new name to the incoming names set; and
   vi. repeating steps 4(i) through 4(v) until all the correspondence between the original name and the cloned name has been found;
5. if the incoming names set has more than one member, merging the members of the incoming names set into a fifth variable, and setting the cloned name to the fifth variable thereby optimizing the source program by establishing the new name; and
6. if the incoming names set has one member, setting the cloned name to the one member of the incoming names set thereby optimizing the source program that executes on the computer by establishing the new name.

7. A computer for optimizing a source program that executes on the computer, comprising:
a graph representing the source program, the graph including a plurality of nodes, each node including at least one instruction, the instruction including at least one variable;
a definition instruction executable procedure including at least one instruction that establishes at least one original name variable, at least one cloned name variable, or at least one incarnation name variable;
a use instruction executable procedure including at least one instruction that includes use of the original name, use of the cloned name, or use of the incarnation name;
a correspondence executable procedure including at least one instruction that maintains correspondence between the cloned name and the original name;
a first executable procedure including at least one instruction that identifies at least one node having the definition instructions and the identified nodes are inside of the loop;
a second executable procedure including at least one instruction that identifies nodes having the use instructions and the identified nodes are outside of the loop;
a tail node executable procedure including at least one instruction that identifies at least one tail node;
a third executable procedure including at least one instruction having the original names that are in the instructions in nodes identified in both the first procedure and the second procedure;
for each tail node:
wherein, when the original name is in the tail node and identified in instructions the third procedure, a cloned definition instruction being inserted in the tail node that includes the cloned name by the correspondence to the original name; and
wherein, for all the use instructions in the second procedure, when the original name is used, and when the cloned name is included in the cloned definition instruction, the corresponding cloned name replaces the original name; and
an executable module representing the instructions in the graph that executes on the computer thereby optimizing the source program that executes on the computer with the cloned name.

8. The computer of claim 7, further comprising: wherein, when the loop is unrolled, and for each tail node further having:
a first variable representing the number of times the loop has been unrolled;
the correspondence executable procedure including at least one instruction that maintains correspondence between the incarnation name and the cloned name;
wherein, for each time the loop is unrolled:
the first variable being set to the number of times the loop has been unrolled; and
a second variable corresponding to the incarnation name and the first variable; and the second variables being merged into the corresponding cloned name thereby optimizing the source program that executes on the computer with the cloned name when the loop is unrolled.

9. The computer of claim 7, further comprising: wherein, when the loop is unrolled, and for each tail further having:

the correspondence executable procedure including at least one instruction that maintains correspondence between the incarnation name and the cloned name;

wherein, for each time the loop is unrolled a third variable corresponding to the each time the loop is unrolled and the incarnation name; and the third variables being merged into the incarnation name thereby optimizing the source program that executes on the computer with the incarnation name when the loop is unrolled.

10. The computer of claim 7, further comprising: when the cloned definition instruction is inserted into the tail node, and for each tail, further having:

wherein, for each of the definition instructions that is identified in the third procedure:
  a fourth variable that corresponds to the definition instruction;
  a definition node that includes the definition instruction;
  a precedessor node that precedes the tail node; and
  wherein, if the definition node dominates the precedessor node, inserting the fourth variable into the cloned name thereby optimizing the source program that executes on the computer by establishing dominance.

11. The computer of claim 7, further comprising: when the original name is replaced with the corresponding cloned name, and for each tail node further having: wherein when the correspondence of all uses of the original name and that are in the second procedure is between one of the cloned names, replacing the all uses of the original name with the one cloned name thereby optimizing the source program that executes on the computer by using the one cloned name.

12. The computer of claim 7, further comprising: when the original name is replaced with the corresponding cloned name, and for each tail node further having:

wherein when the correspondence of the all uses of the original name that are in the second procedure is between more than one of the cloned names, and for each of the use instructions that is in the second procedure and that is not in the tail nodes:
  an incoming names node;
  a fourth instruction that corresponds to the use instruction that is in the second procedure and that is not in the tail nodes;
  a first node that includes the fourth instruction and that includes use of at least one of the original names;
  wherein, for each node that precedes the first node:
    i. the node that precedes the first node being labeled as a second node;
    ii. a new name variable;
    iii. the correspondence executable procedure including at least one instruction that maintains correspondence between the original name and the cloned name in the second node;
    iv. the new name being assigned the cloned name when the correspondence between the original name and the cloned name is found;
    v. the new name being added to the incoming names node; and
    vi. repeating (i) through (v) until all the correspondence between the original name and the cloned name has been found;
  if the incoming names node has more than one member, merging the members of the incoming names node into a fifth variable, and setting the cloned name to the fifth variable thereby optimizing the source program by establishing the new name; and
  if the incoming names node has one member, setting the cloned name to the one member of the incoming names node thereby optimizing the source program that executes on the computer by establishing the new name.

13. An article of manufacture comprising a program storage medium having computer readable program code embodied therein for optimizing a source program for execution on a computer, the computer readable program code including computer readable program code for representing a source program having at least one loop, and at least one instruction having at least one variable, by a graph including a plurality of nodes, each node including at least one of the instructions, the article of manufacture comprising:

computer readable program code for including definition instructions, that establishes at least one original name variable, at least one cloned name variable, or at least one incarnation name variable;

computer readable program code for including use instructions that include use of the original name, use of the cloned name, or use of the incarnation name;

computer readable program code for maintaining correspondence between the cloned name and the original name;

computer readable program code for including a set of at least one first instruction that identifies nodes having the definition instructions and the identified nodes are inside of the loop;

computer readable program code for including a set of at least one second instruction that identifies nodes having the use instructions and the identified nodes are outside of the loop;

computer readable program code for including a set of at least one tail node;

computer readable program code for including a set of at least one third instruction having the original names that are in both the first instruction set and the second instruction set;

wherein, for each tail node in the set of tail nodes:
  wherein, when the original name is in the tail node and the third instruction set, computer readable program code for inserting in the tail node a cloned definition instruction that establishes the cloned name by the correspondence to the original name; and
  wherein, for all the use instructions in the second instruction set, when the original name is used, and when the cloned name is established in the cloned definition instruction, computer readable program code for replacing the original name with the corresponding cloned name; and computer readable program code for generating an executable module from the graph for execution on the computer thereby optimizing the source program with the cloned name.

14. The article of manufacture as set forth in claim 13, further comprising:

computer readable program code for each tail node in the set of tail nodes and that when the loop is unrolled, further including:

computer readable program code for including a first variable that represents the number of times the loop is unrolled;

computer readable program code for maintaining correspondence between the incarnation name and the cloned name;

wherein, for each time the loop is unrolled:

computer readable program code for setting the first variable to the number of times the loop has been unrolled; and computer readable program code for including at least one second variable by inserting the first variable and the incarnation name into the second variable to maintain correspondence between the incarnation name and the first variable; and computer readable program code for merging the second variables into the corresponding cloned name thereby optimizing the source program with the cloned name when the loop is unrolled.

15. The article of manufacture as set forth in claim 13 further comprising:

computer readable program code for each tail node in the set of tail nodes and when the loop is unrolled, further including:

computer readable program code for maintaining correspondence between the incarnation name and the cloned name;

wherein, for each time the loop is unrolled computer readable program code for maintaining a third variable corresponding to the each time the loop is unrolled and the incarnation name; and computer readable program code for merging the third variables into the incarnation name thereby optimizing the source program with the incarnation name when the loop is unrolled.

16. The article of manufacture as set forth in claim 13, further comprising:

computer readable program code for inserting in the tail node the cloned definition instruction, and wherein, for each of the definition instructions that is in the third set, further having:

computer readable program code for including a fourth variable that corresponds to the definition instruction;

computer readable program code for including a definition node that includes the definition instruction;

computer readable program code for including a predecessor node that precedes the tail node; and wherein, if the definition node dominates the predecessor node, computer readable program code for inserting the fourth variable into the cloned name thereby optimizing the source program by establishing dominance.

17. The article of manufacture as set forth in claim 13, further comprising:

computer readable program code for replacing the original name, further having:

computer readable program code for establishing when the correspondence of all uses of the original name that are in the instructions in the second instruction set is between one of the cloned names, and computer readable program code for replacing the all uses of the original name with the one cloned name.

18. The article of manufacture as set forth in claim 13, further comprising:

computer readable program code for replacing the original name, further having:

computer readable program code for establishing when the correspondence of the all uses of the original name that are in the second instruction set is between more than one of the cloned names, and for each of the use instructions that is in the second instruction set and that is not in the tail node set:

computer readable program code for including an incoming names set;

computer readable program code for including a fourth instruction that corresponds to the use instruction that is in the second instruction set and that is not in the tail node set;

computer readable program code for including a first node that includes the fourth instruction, and that includes use of at least one of the original names;

computer readable program code wherein for each node that precedes the first node:

i. computer readable program code for labeling a second node that precedes the first node;

ii. computer readable program code for including a new name variable;

iii. computer readable program code for searching in the second node for the correspondence between the original name and the cloned name;

iv. computer readable program code for assigning the new name the cloned name when the correspondence between the original name and the cloned name is found;

v. computer readable program code for adding the new name to the incoming names set; and vi. computer readable program code for repeating (i) through (v) until all the correspondence between the original name and the cloned name has been found;

if the incoming names set has more than one member, computer readable program code for merging the members of the incoming names set into a fifth variable, and setting the cloned name to the fifth variable thereby optimizing the source program by establishing the new name; and if the incoming names set has one member, computer readable program code for setting the cloned name to the one member of the incoming names set thereby optimizing the source program by establishing the new name.

* * * * *

UNITED STATES PATENT AND TRADEMARK OFFICE
CERTIFICATE OF CORRECTION

PATENT NO. : 6,064,820
DATED : May 16, 2000
INVENTOR(S) : Pratap Subrahmanyam

It is certified that error appears in the above-identified patent and that said Letters Patent is hereby corrected as shown below:

<u>Column 14,</u>
Line 4, after "optimizing" delete "in"

Signed and Sealed this

Eighteenth Day of June, 2002

Attest:

Attesting Officer

JAMES E. ROGAN
*Director of the United States Patent and Trademark Office*